United States Patent
Montgomery et al.

(10) Patent No.: US 6,401,081 B1
(45) Date of Patent: Jun. 4, 2002

(54) MODULAR OBJECT-BASED ARCHITECTURE FOR EXTENSIBLE MASTER STATION SOFTWARE

(75) Inventors: Michael Andrew Montgomery, Duluth; Lloyd Howard Strine, Dunwoody; Susanne Kristina Marie Howard, Chamblee; Leor Amikam, Alpharetta; Neil MacLean, Atlanta, all of GA (US); Mark Alan Hastings, Seneca, SC (US)

(73) Assignee: Schlumberger Resource Management Services, Inc., DE (US)

( * ) Notice: Subject to any disclaimer, the term of this patent is extended or adjusted under 35 U.S.C. 154(b) by 0 days.

(21) Appl. No.: 08/560,168

(22) Filed: Nov. 20, 1995

(51) Int. Cl.[7] .............................................. G06F 17/60
(52) U.S. Cl. .................... 705/63; 705/412; 379/106.03; 709/203; 709/332; 340/870.02; 340/870.41
(58) Field of Search .................. 395/680, 681, 395/682; 709/300, 320, 327, 321, 310, 328, 203, 330, 332; 379/106.03–106.11, 107; 705/412, 63, 400; 340/870.02, 870.03, 870.07, 870.41

(56) References Cited

U.S. PATENT DOCUMENTS

| | | | | |
|---|---|---|---|---|
| 4,504,831 A | * | 3/1985 | Jahr et al. | 340/870.02 |
| 4,866,761 A | * | 9/1989 | Thornborough et al. | 379/106.04 |

(List continued on next page.)

FOREIGN PATENT DOCUMENTS

| | | | |
|---|---|---|---|
| EP | 0474407 A1 | * | 3/1992 |
| EP | 0598297 A2 | * | 5/1994 |
| WO | WO 89/06079 | * | 6/1989 |
| WO | WO-93/0215 | * | 2/1993 |

OTHER PUBLICATIONS

Keough, Lee, "Objective: Better Software", Computer Decisions, vol. 21, No. 3, p. 37, Mar. 1989.*

(List continued on next page.)

*Primary Examiner*—James P. Trammell
*Assistant Examiner*—John W. Hayes
(74) *Attorney, Agent, or Firm*—Sanford J. Asman

(57) ABSTRACT

Conventional AMR and DA/DSM systems typically suffer from a lack of extensibility due to the monolithic nature of the master station software. In contrast, this patent describes a system that is comprised of small modules connected using a component object model. This system allows straightforward extension in the areas of applications, communications, metering devices, and databases without requiring recompilation or relinking of the system. Furthermore, this system allows commercial applications such as spreadsheets, word processors, statistical packages, report generators, et cetera to be integrated directly with this system, and allows extension and customization of the system using such packages. Such a flexible open architecture is very attractive to utilities in that it allows easy extension by the utility or other third party developers without the involvement of the original authors of the system.

20 Claims, 8 Drawing Sheets

U.S. PATENT DOCUMENTS

| | | | | | |
|---|---|---|---|---|---|
| 5,128,988 | A | * | 7/1992 | Cowell et al. | 379/106.03 |
| 5,134,650 | A | * | 7/1992 | Blackmon | 379/107 |
| 5,161,182 | A | * | 11/1992 | Merriam et al. | 379/106.07 |
| 5,175,855 | A | * | 12/1992 | Putnam et al. | 395/681 |
| 6,018,726 | A | * | 12/1993 | Tsumura | 705/412 |
| 5,311,581 | A | * | 5/1994 | Merriam et al. | 379/106.07 |
| 5,414,812 | A | * | 5/1995 | Filip et al. | 703/103 |
| 6,069,571 | A | * | 10/1995 | Tell | 340/870.02 |
| 5,495,239 | A | * | 2/1996 | Ouellette | 340/870.02 |
| 5,504,906 | A | * | 4/1996 | Lutoff | 395/682 |
| 5,572,675 | A | * | 11/1996 | Bergler | 395/682 |
| 5,590,179 | A | * | 12/1996 | Shincovich et al. | 379/106.06 |
| 5,590,288 | A | * | 12/1996 | Castor et al. | 395/200.03 |
| 5,650,936 | A | * | 7/1997 | Loucks et al. | 702/62 |
| 5,691,973 | A | * | 11/1997 | Ramstrom et al. | 370/58.2 |
| 5,751,797 | A | * | 5/1998 | Saadeh | 379/106.03 |
| 5,764,739 | A | * | 6/1998 | Patton et al. | 379/106.03 |
| 5,960,004 | A | * | 9/1999 | Ramstrom et al. | 370/469 |

OTHER PUBLICATIONS

"Object Technology", CASE Strategies, vol. 3, No. 4, Apr. 1991, Dialog File 636:Gale Group Newsletter DB, No Author.*

Cupp, James G., "A Management Perspective on Open Systems", Transmission & Distribution, vol. 44, No. 12, pp. 28–31, Nov. 1992.*

Hill, George M., "Reinventing Systems in the Utilities Industry", Fortnightly, vol. 131, No. 21, pp. 35–40, Nov. 15, 1993.*

Kuo, Alex, "Distributed Objects Cross Many Platforms", Electronics Engineering Times, p. 106, Jun. 1, 1994.*

Cavanaugh, Herbert A., "Utilities Move Cautiously to Distributed Computing", Electrical World, vol. 208, No. 11, p. 29, Nov. 1994.*

Open Horizon, Inc. Launches Connection for Enterprise Client/Server; Standards Based Product Provides Open Access to Enterprise Services, Dialog File 810:Business Wire, Jun. 12, 1995, No Author.*

Orfali et al. "Essential Client/Server Survival Guide," Van Nostrand Reinhold, pp. 150, 197–200, 385–392, 1994.*

Salamone, Salvatore, "Novell Builds a Nest," BYTE, pp(4), Aug. 1995.*

Jun–ichiro Itoh and Yasuhiko Yokote, Concurrent Object–Oriented Device Driver Programming in Apertos Operating System, Aug. 24, 1999, pp. 1–8.*

Mark Betz, Interoperable Objects, Dr. Dobbs Journal, Oct. 1994, pp. 1–18.*

Sarah Williams, Charles Kindel, The Component Object Model: A Technical Overview, Developer Relations Group Microsoft Corporation, pp. 1–18, Oct. 1994.*

Mark Betz, InterOperable Objects, Dr. Dobb's Journal, p. 18–20, 24–26, 28, 32, 34, 36–39, Oct. 1994.*

* cited by examiner

MODULAR OBJECT-BASED ARCHITECTURE FOR EXTENSIBLE MASTER STATION SOFTWARE

BACKGROUND OF THE INVENTION

The present invention relates to systems used in the utility industry. In particular, the invention relates to metering, network, database, and computer application systems used in the utility (i.e., gas, water, and electricity) industries.

Heretofore, it was common for the manufacturer of meters or other devices used in the utility industry to develop metering devices which could be read by certain, specific means, and which could be programmed, if at all, by certain specific means. By way of example, in the electricity industry, the manufacturer of a particular meter could include a register thereon which was capable of storing certain metering information, i.e., total KwHr metered, time of use information, maximum demand over some time period, etc. For each meter developed by each manufacturer, the way in which the data was retained in the meter and the manner in which data could be extracted from the meter was often unique to a particular meter. Thus, it was not only possible, but common, for there to be a variety of meters, manufactured by the same manufacturer which each retained somewhat different data in somewhat different formats, and it was common to have situations in which it was necessary to extract that data using a specific technique, which involved the use of a unique piece of software. By way of example, meters could be read using optical ports, direct (wired) connections, telephone modems, power line carrier ("PLC") communications, radio ("RF") means, etc. Further, each meter would typically use a different type of software to read and/or program features which were present in the meter. If that did not complicate matters enough, each manufacturer would typically develop its own communications "protocol" to communicate with the meters which it developed.

In the area of communications protocols alone, different meter manufacturers each approached the idea of a protocol somewhat differently. Thus, one manufacturer might define a communications protocol in a manner which allowed a particular command to extract a particular type of data from a particular meter. Yet another manufacturer might define the "protocol" as the communications method for communicating with the meter, and the meters of that manufacturer would typically retain data in each of its meters in particular memory locations. In order to program (or obtain data from) the latter type of meters, it was necessary to know both the protocol and the "memory map" which detailed the memory locations of the data within the meter.

In view of the numerous types of meters and the numerous meter manufacturers, the number of individual pieces of computer software which were needed by a utility to set up, program, and read meters continued to grow, much to the dismay of the utilities which found that they needed to maintain numerous pieces of computer software in order to accomplish the tasks which they had to regularly perform. Further, depending upon the size of the utility, the purpose of the software, and when the software was initially installed, utilities could find themselves operating software on a number of different platforms, which typically included UNIX®, MS-DOS, and WINDOWS.

In an effort to assist the utilities in limiting the number of different computer software packages which they had to maintain, suppliers to the industry started to provide so-called "multi-vendor" systems. Such multi-vendor systems, i.e., the Schlumberger Industries MULTI-MASTER® software or the Utility Translation System MV-90™ software, were able to communicate with the meters of more than one manufacturer. However, they, too, had problems, in that a number of manufacturers perceived the need to maintain their protocols and memory maps as trade secrets in order to prevent competitors from "cloning" their equipment and thereby trading upon the good will which they had established with their customers. This was a particularly troublesome problem in those instances in which an interloper appeared on the scene with a meter which they claimed to be a "clone" of a meter sold by an established manufacturer, and then only after buying the meter, would the utility learn that the "new" meter did not perform the same as the one which had been "cloned".

Other problems with multi-vendor systems involved the fact that in order to develop such systems it was necessary for the system developer to have access to information which the meter manufacturer might consider to be proprietary. Accordingly, the development and marketing of a new meter often became difficult. It was difficult for the meter manufacturer, which had to have software support for its meter, because until the company doing the software support actually implemented the meter support in their software, and until the software was released, the utilities could not use the meter, so the manufacturer could not sell the meter. The meter manufacturers could not add the software support for new meters into existing multi-vendor systems due to the closed architecture which such systems employed. Similarly, the software support companies were continuously in a situation in which they were trying to implement support for new meters, while performing updates to their packages to further support meters already in the field.

From the utilities perspective, unless a meter had adequate system support, it could not be used. Even meters which were supported, could not always be used, if the system on which they were supported differed from the system which the particular utility was using. Thus, depending upon the computer platform which was used at a particular utility, the operating system being used on that platform, whether or not the utility had made a committment to the use of a particular multi-vendor computer software system, and the types of meters already in the utility, the utility's decision to purchase a particular meter could be greatly affected.

Finally, individual utilities would often find the need to have specialized computer application software developed to meet specific, internal needs of the utility. As there are many utilities which do not maintain their own internal programming staff, it was necessary for them to hire outside consultants to develop the applications software. For both those utilities which had an internal programming staff and those who used outside programmers it was necessary to obtain the communications protocol, and memory map information from the meter manufacturers to even begin to develop an application which could be used to generate even a simple report.

Thus, unless a utility chose to limit the number of types of meters which it would purchase, the types of computers on which it would operate its software, the particular databases which it maintained, and a host of other factors, all of which were limiting to the manufacturer's ability to meet specific needs, there was no easy way to address the issues of universal system compatibility. Even worse, each time another new type of meter or application or database engine or computer system was introduced, the problem of integrating the various items into an existing system grew exponentially.

In view of the foregoing problems, many utilities called for the manufacturers to develop a "standard" way of communicating with metering equipment. However, other manufacturers and utilities wanted to retain the ability to add additional features to the future metering equipment which they sought to manufacture and purchase. Consequently, there was no simple solution which was universally acceptable, and as new microprocessor based solid-state meters brought additional features to the market place, and as demand developed for automatic meter reading ("AMR") equipment increased, the problems continued to mount.

In particular, utilities have turned to AMR systems in order to allow timely reads of customer's meters on a scheduled and/or demand basis, without requiring access to the customer premises. These systems are becoming increasingly complex as new features are added such as outage detection, tamper detection, remote disconnect, and other distribution automation and demand side management ("DA/DSM") applications.

The continued demand for new features requires extension of the master station software in several areas. First, there are new applications needed for handling these new functions. Second, there is pressure to support a large number of different metering devices, i.e., electric, water, gas, and heat metering devices. Third, it is necessary to support different communication infrastructures, since different communications methods such as telephone inbound and outbound, radio networks, power line carrier, hand-held devices, and drive-by devices are needed in different situations. Finally, t is desirable to support a variety of different databases, since various utilities have standardized on different database packages.

Conventional AMR and DA/DSM systems typically suffer from a lack of extensibility due to the monolithic nature of the master station software. As described above, adding any new features to such systems is a very difficult process, and requires recompilation and/or relinking of the software to accommodate the new features. Typically, these extensions can only be performed by developers having access to the source code of the particular system.

In view of the foregoing problems, a new approach was required.

SUMMARY OF THE INVENTION

In contrast to the monolithic structures of the prior art, the present invention is comprised of relatively small modules which export well-defined application interfaces using a component object model ("COM"). It is based on the industry standards of Object Linking and Embedding ("OLE") and Open Database Connectivity ("ODBC"). The present system allows straightforward extensions in any of the four dimensions listed above (applications, communications, metering devices, and databases) without requiring recompilation or relinking of the system, and provides compatibility with many commercial software packages.

A key foundational decision in the implementation of the preferred embodiment of the invention was the selection of the software framework, i.e., the collection of underlying software technologies used to construct the software architecture. Technology choices had to be made in the areas of the component object model, component communication, database connectivity, the underlying application programming interface, the class library, and operating systems.

To select this framework, the primary goals of the inventive system were to maximize the effectiveness of software development, i.e., get the best product for the development money spent; and to provide an open system which permits easy extension by the customer and/or third party developers and which can integrate with commercial software packages.

Based upon these primary goals, a set of selection criteria for the framework was defined. It must be based upon well-supported commercial standards. It must permit decomposition into small modules which are easier to develop and customize. It must permit easy customization via new modules without relinking the entire system. It must permit maximum use of commercial components within the framework. It must have the ability to target all required platforms using the same source code. It must have a predicted longevity. It must provide support for the most widely used databases. It must support distributed computation for upward scaleability. Finally, it should be in the mainstream of software development to maximize the options for software tools, applications, and cross-platform support.

Based upon the foregoing framework requirements, a completely new object oriented, modular approach to system support for use in the utility industry was developed, and that is the subject of the present invention. In accordance with the invention, it was determined that the techniques of Object Linking and Embedding ("OLE"), as described by Brockschmidt, Kraig; in Inside OLE 2, Microsoft Press (1994), the contents of which are incorporated herein by reference, provided the leading standard for object-based component communication. Over 1,000 commercial applications provide OLE support, which allows them to be integrated with the inventive system. OLE supports decomposition into small modules, and allows customization by adding or replacing modules without recompiling or relining the system.

OLE objects can communicate through three different mechanisms. In particular, objects may be called by direct function calls for those objects that are linked through a dynamically linked library ("DLL"). This provides the best performance, but requires the DLL to be linked to the same executable file ("EXE" file). Objects can also be accessed in different executable files in the same computer through a local remote procedure call ("RPC") as described by Guy Eddon in RPC for NT, R&D Publications (1994), the contents of which are incorporated herein by reference. This allows adding new modules or replacing modules without linking, but has lower performance than that provided by a DLL. Finally, objects can be accessed on other machines through Distributed Computing Environment ("DCE") RPCs. This allows a fully distributed system to be deployed for upward scaleability. An extremely attractive aspect of the present inventive approach is that the client does not have to know in advance which of the three cases described above apply. The client simply sends messages to the object, and the system determines how to get the message to the object. Thus, the same code can be used regardless of whether the DLL is linked directly or whether it is distributed on a different computer.

In an alternative embodiment of the present invention, component communication could be carried out using Common Object Request Broker Architecture ("CORBA"). Although this is also a strong technology, and could be used without departing from the inventive concept, it is not as widely used as that described above, and relatively few commercial applications are available that support CORBA. Commercial support for OLE is clearly growing, while the future of CORBA is less certain. However, those skilled in the art will recognize that there are a number of alternatives to the preferred embodiment of the invention, and that if interoperability with CORBA is needed, it is available, and it is within the scope of the present invention. In fact, Digital Equipment Corporation, located in Maynard, Massachusetts, provides a gateway between CORBA and OLE which is called their Object Broker package. Accordingly, while CORBA is considered an alternative, it is by no means inconsistent with the teachings herein.

The underlying component object technology used by OLE is the Component Object Model ("COM"), the selection of OLE, therefore, constrains us to also use COM which provides a standard for component interoperability. This implies that all COM components will work together, regardless of their source (in-house, commercial, third party, etc.), when the components are developed (components developed now will work with components developed years ago, and they will continue to work with components developed in the future), and what programming language is used (C, C++, Basic, etc.). Furthermore, such objects can be used in a distributed or client/server architecture without any change, as discussed above. This interoperability is achieved through the underlying technologies of queryable interfaces and unique identifiers.

Queryable interfaces allow a client to ask what interfaces are supported. This allows object and client to communicate in the richest set of languages which they share in common. It also allows discovery of features at run-time instead of hard-coding at compile time, and permits new functionality to be added later with full backwards compatibility.

The provision of unique identifiers is actually part of the Distributed Computing Environment ("DCE") standard. This provides each object with a globally unique identifier so that the object may be located, even if it is located on a remote machine. This is key for supporting a distributed architecture.

The RPC mechanism used with OLE is DCE/RPC. As will be recognized by those skilled in the art, while local RPC is presently a part of the OLE standard, DCE/RPC is not part of that standard. However, DCE/RPC is a widely supported standard that provides excellent features for distributed systems such as unique identifiers, support for heterogeneous networks, and security.

In the preferred embodiment of the invention, the WIN32 Application Programming Interface (API) was selected. While the selection of the underlying API is extremely important, and while potential candidates included the WIN16, WIN32, and UNIX® APIs, the WIN32 API was the preferred selection, although any of the others could be used without departing from the inventive concept. The WIN16 API was rejected because of the longevity constraint, since all new Microsoft support is for WIN32 API only. It first seemed that both the WIN32 and UNIX® APIs would have to be supported, since products must be deployed on both Windows NT™ and UNIX® platforms. However, this violated the criteria to target all required platforms using the same source code.

The solution to this dilemma was to use third party software packages that support the WIN32 API on UNIX® platforms as described by Cullens, Chane and Blackwell, Ken in Cross-Platform Development Using Visual C++, M&T (1995), the contents of which are incorporated herein by reference. This allows development using the WIN32 API and then retargeting the software to UNIX® by linking with third party packages that resolve all of the WIN32 API references in terms of the underlying UNIX® API, as illustrated by FIG. 2. Retargeting packages are provided by several different vendors. These products have the additional advantage that the differences between various UNIX® platforms (SUN OS 4.1.3, Solaris 2.x, HP/UX, AIX et cetera) are handled by providing different libraries, so that code can be common even between different UNIX® platforms.

DETAILED DESCRIPTION OF THE PREFERRED EMBODIMENT OF THE INVENTION

As described above, the underlying component object technology used by OLE is called the Component Object Model ("COM"). The selection of OLE, therefore, constrains us to also use COM. COM provides a standard for component interoperabiibty. This implies that all COM components will work together, regardless of their source (in-house, commercial, third party), when the components are developed (components developed now will work with components developed years ago, and with components which are developed in the future). Also, COM components will work together, irrespective of the programming language which was used (C, C++, Basic, etc.) to create them. Furthermore, such objects can be used in a distributed or client/server architecture without any change, as discussed above. This interoperability is achieved through the underlying technologies of queryable interfaces and unique identifiers.

The use of queryable interfaces allows a client to ask what interfaces are supported, and thereby allows the object and the client to communicate in the richest set of languages which they share in common. It also allows discovery of features at run-time instead of hard-coding at compile time, and permits new functionality to be added later with full backwards compatibility.

Unique identifiers is actually part of the DCE standard. It provides each object with a globally unique identifier. Consequently, objects may be located, even when they are on remote machines, thereby providing for and supporting a distributed architecture.

Figure 1:
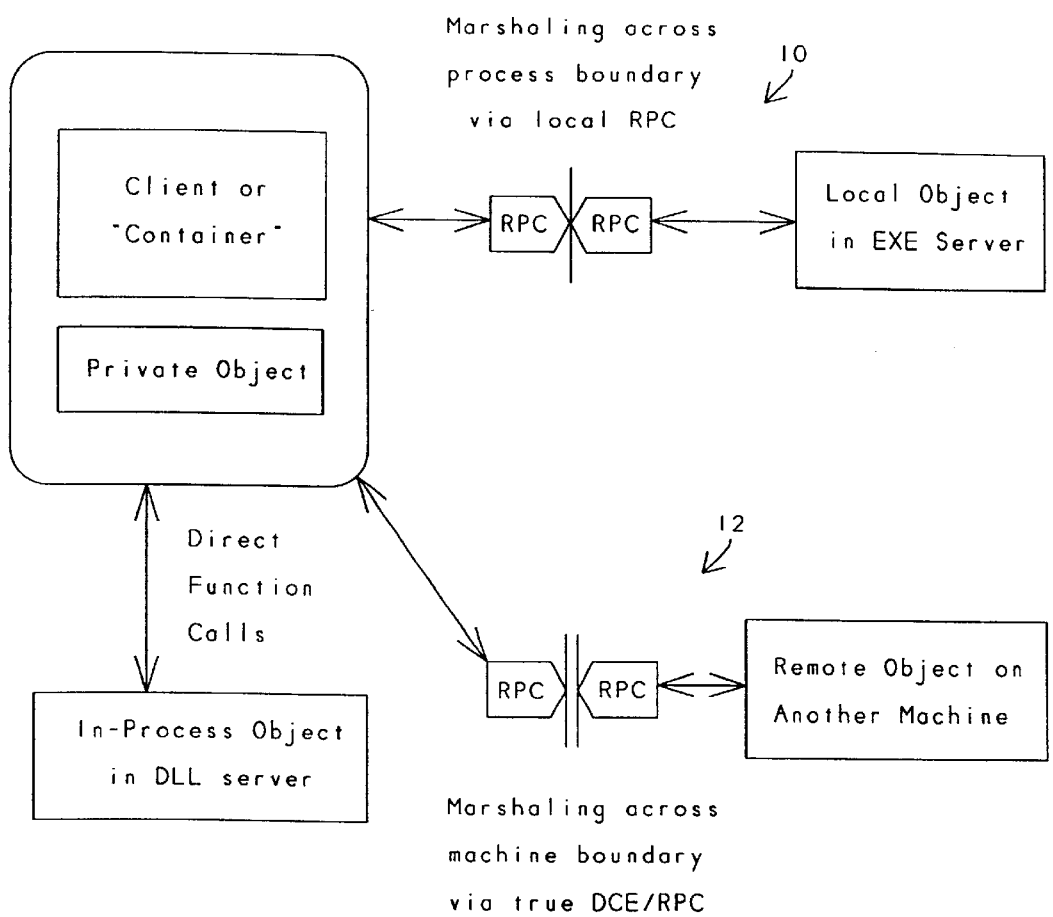
FIG. 1 illustrates the manner in which RPC is used to access objects in one location from another location.
Figure 2:
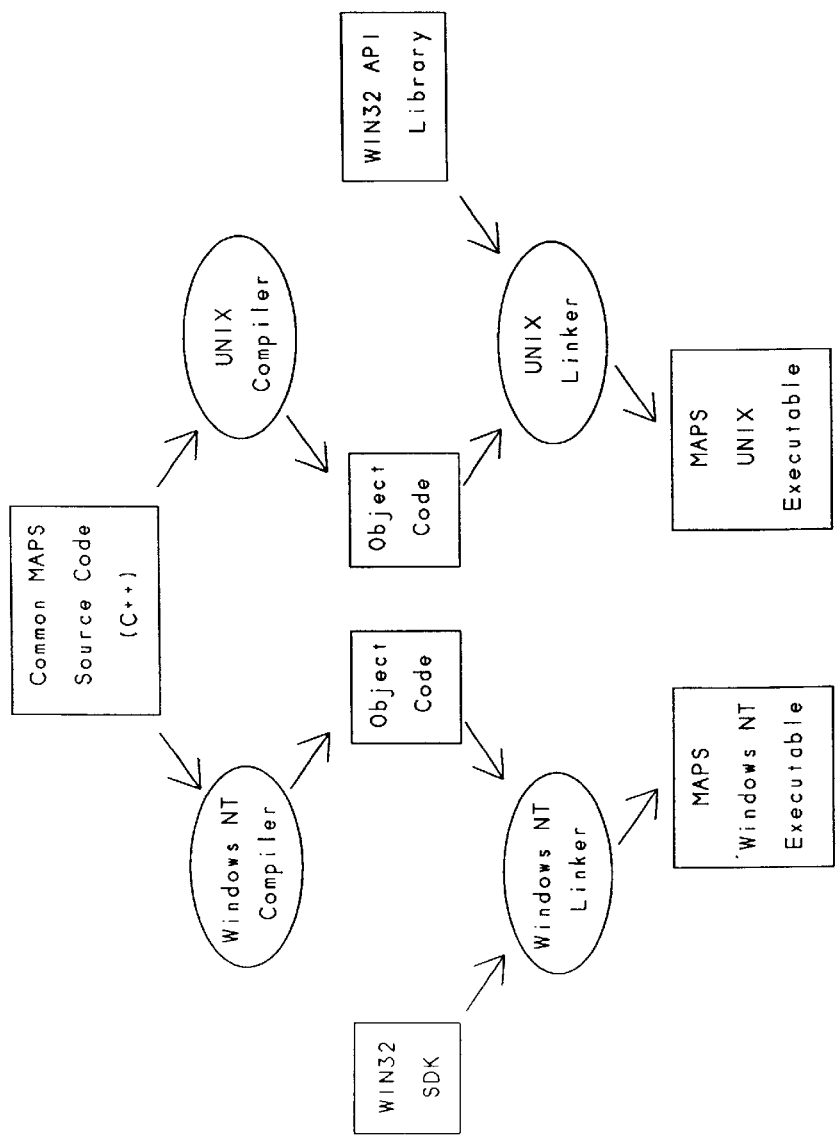
FIG. 2 illustrates how a single set of source code can be targetted to different operating systems.

As set forth above, and as illustrated in FIG. 1, the RPC mechanism which is presently part of the OLE standard is local RPC 10. However, in order to support the distribution of modules on remote machines, DCE/RPC 12 has been added to the present invention, to permit any remote communications which may be required. DCE is a widely supported standard that provides excellent features for distributed systems such as unique identifiers, support for heterogeneous networks, and security.

As described above, the selection of the underlying API was also extremely important. Those skilled in the art will recognize that potential candidates included the WIN16, WIN32, and UNIX® APIs, all of which could be used without departing from the scope of the present invention. In the preferred embodiment of the invention, the WIN32 API was selected, since all new Microsoft support is directed to the WIN32 API, rather than the WIN16 API. While those skilled in the art might, at first believe that both the WIN32 and UNIX® APIs would have to be supported, since commercial products are likely to be deployed on both Windows NT™ and UNIX® platforms, one object of the preferred embodiment of the invention is to target all required platforms using the same source code. That objective could not be met unless a single API was selected. Accordingly, in the preferred embodiment of the invention, the solution to this problem was the use of third party software packages that support the WIN32 API on UNIX® platforms as described by Cullens, Chane and Blackwell, Ken in Cross-Platform Development Using Visual C++, M&T (1995). Thus, in the preferred embodiment of the invention there is a single source code development using the WIN32 API. The software is retargeted to UNIX® by linking with third party packages that resolve all of the WIN32 API references in terms of the underlying UNIX® API. As will be understood by those skilled in the art, retargeting packages are provided by several different vendors. These products have the additional advantage that the differences between various UNIX® platforms are handled by providing different libraries, so that code can be common even between different UNIX® platforms. Thus, by way of example, SUN OS 4.1.3, Solaris 2.x, HP/UX, AIX etc. are handled by providing different libraries, so that code can be common even between different UNIX® platforms.

Figure 3:
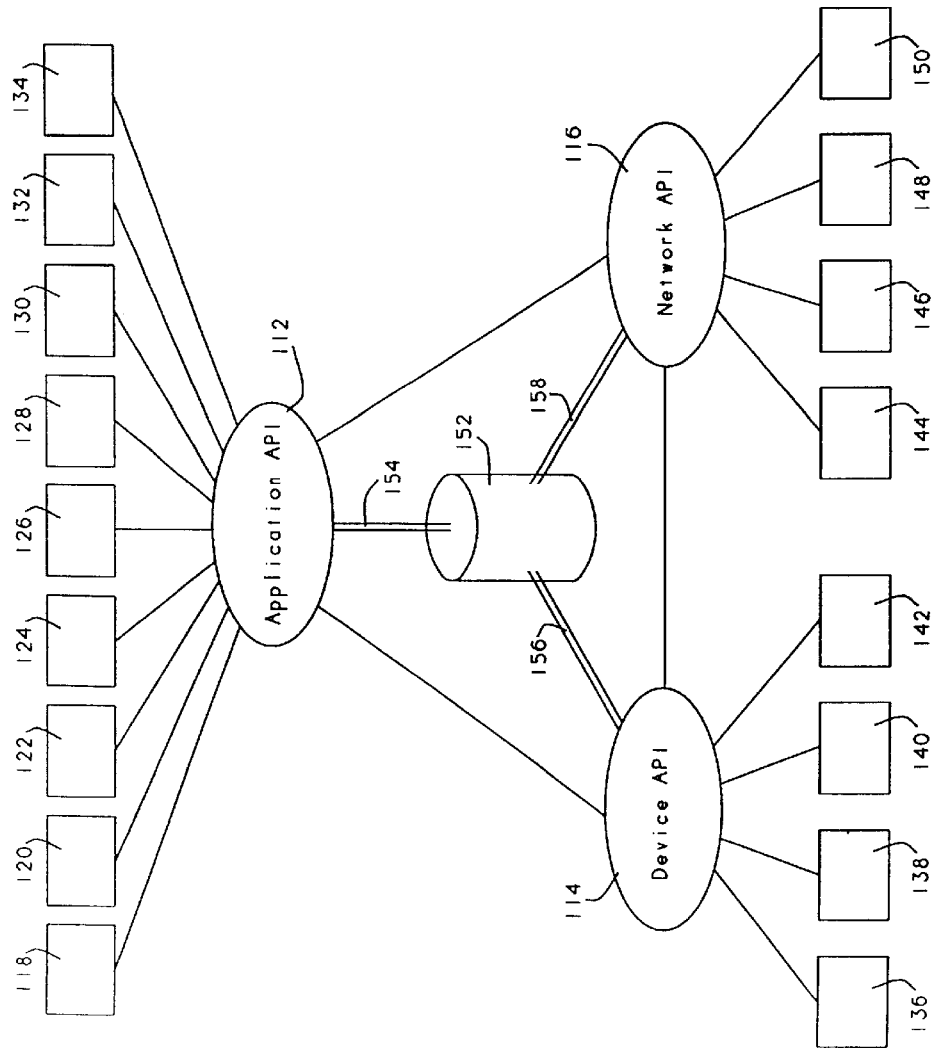
FIG. 3 illustrates an overview of the present inventive architecture.

Referring to FIG. 3, each class of module is defined by an appropriate Application Programming Interface (API). Thus, there is an Application API 112, a Device API 114, and a Network API 116. Within each of these API's, 112, 114, 116, referred to herein as "module classes", there are many different kinds of modules that can be written in order to support, respectively, appropriate applications, devices, and networks.

By way of example, a variety of application modules 118, 120, 122, 124, 126, 128, 130, 132, and 134, are shown to be connected to the Application API 112. These connections are preferrably made using OLE and/or DCE/RPC, as described above. Without limiting the intended generality of the applications, and by way of example, these applications can include all or some of the following—commercially available software applications, i.e., Microsoft Excel, Lotus 1-2-3, Microsoft Access, FrameMaker, Microsoft Word, or Claris products may be represented by the module 118; AMR applications, i.e., billing, time-of-use, consumption, or reporting may be represented by the module 120; communications applications, i.e., demand read or outage reporting may be represented by the module 122; electricity applications, i.e., power quality or supply management may be represented by the module 124; water and gas applications, i.e., leak detection or supply management, may be represented by the module 126; database applications, i.e., reporting and data import/export may be represented by the module 128; distribution automation ("DA") applications, i.e., load shedding or capacitor switching, may be represented by the module 130; demand side management ("DSM") applications, i.e., "smart" appliances, security, and messaging, may be represented by the module 132; and device maintenance applications, i.e., result data, and device configuration, may be represented by the module 134.

With continued reference to FIG. 3, device applications are shown as modules 136, 138, 140, and 142. Again, by way of example, the types of device applications may be represented by electricity devices, represented by the module 136; water devices, represented by the module 138; gas devices, represented by the module 140; and concentrator devices, represented by the module 142. The specific devices which are contemplated by the various modules are intended to include both presently available devices and devices which are hereafter developed. Thus, the electricity devices, represented by module 136 can include such things as meter interface units ("MIUs"), such as the T3000, manufactured by Schlumberger Industries, Inc.; solid-state metering equipment, such as the SQ400 or QM110 meters manufactured by Schlumberger Industries, Inc.; electromechanical meters, which include some type of sensor (i.e., optical sensor) for reading the rotation of the disk, such as the J5 electricity meter manufactured by Schlumberger Industries, Inc.; or electronic registers, such as the D200, manufactured by Schlumberger Industries, Inc. Similarly, the water devices, represented by module 138 may include MIUs, such as the TDI1500, manufactured by Schlumberger Industries, Inc.; ARB5 encoders; or other types of devices. Water devices, represented by the module 140, may include the TDI1500 MIU, pulse encoders, or ARB encoders. Concentrator devices, represented by the module 142 may include handheld terminals or remote terminal equipment.

With respect to the network modules 144, 146, 148, 150, which connect to the Network API 116, these may include handheld terminals, such as the Advance (by Schlumberger Industries, Inc.), or the DAP, or Jumbo units, represented by the module 144; they may include power line carrier ("PLC") systems, represented by the module 146; telephone inbound and outbound systems, using a SLAC or COSU, represented by the module 148; or RF systems, such as the AMRT (Motorola/Schlumberger Industries) RF system.

The connections between the modules discussed above are illustrated in FIG. 3 by solid lines, and they are made using OLE and/or DCE/RPC. OLE is by far the most prevalent component software standard, boasting over 1,000 compliant applications by various companies. This is of key importance since any commercial application using this standard can be directly linked to this architecture through the Application API, as shown by the module 118. Customization of the present invention, which is called "MAPS™", using commercial applications such as Microsoft Excel, Microsoft Chart, Microsoft Word, Microsoft Access, Microsoft Visual Basic, Microsoft FoxPro, and Lotus 1-2-3 has already been successfully demonstrated.

With continued reference to FIG. 3, a database 152, is shown to be linked to the various APIs 112, 114, 116 by means of the Open DataBase Connectivity ("ODBC") standard. These ODBC links 154, 156, 158 are represented by double lines. As will be recognized by those skilled in the art, the ODBC standard provides a portable database access mechanism that can be used with most structured query language ("SQL") and many non-SQL databases across a wide variety of platforms, thereby allowing for flexibility in the choice of database for each system to better meet the customer's needs. The present invention is not dependant upon the specific database 152 (or platform) used, so long as it has appropriate ODBC drivers. Three databases, i.e., Oracle, a high-end SQL database running on UNIX®; Watcom SQL, a mid-level royalty free SQL database running on Windows NT; and Microsoft Access, a low-end non-SQL database running on Windows 3.1, were selected for initial testing with the present invention. Each of these databases was successfully used with the same ODBC source code, notwithstanding the wide spectrum of capabilities which these databases encompass. Other databases, i.e., DB2, Sybase, Microsoft SQL Server 6 (distributed database version), and Visual FoxPro, could be also be used without departing from the spirit or scope of the present invention, provided, of course, that they have drivers which are compliant with ODBC.

Figure 4:
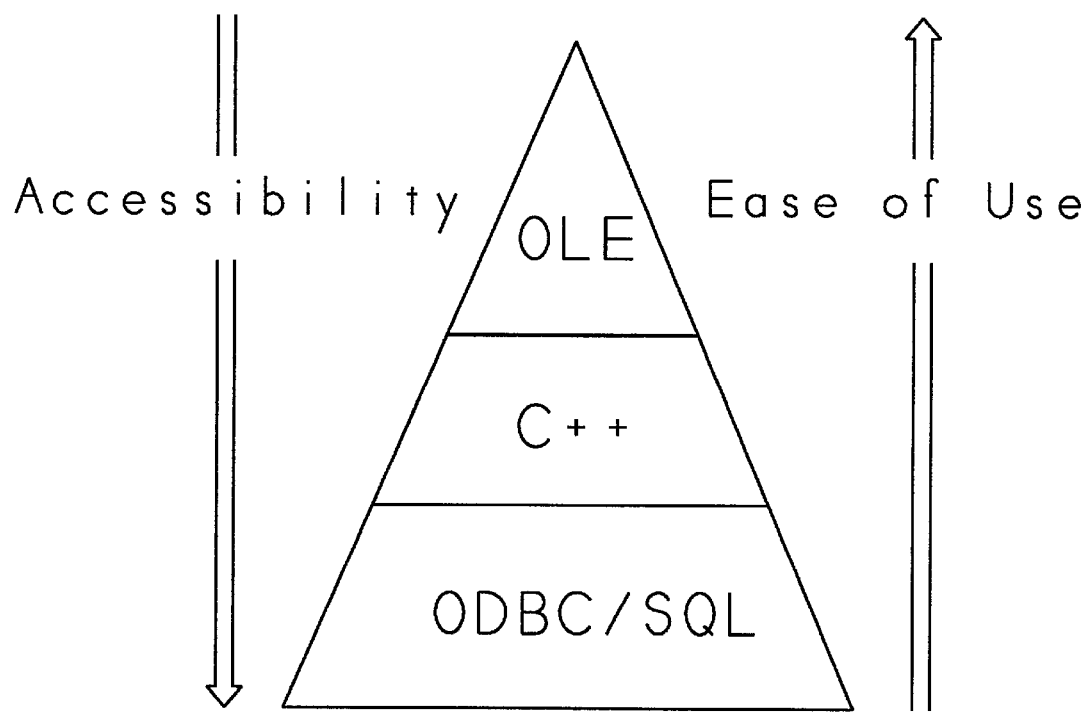
FIG. 4 illustrates the tradeoffs between accessibility and ease of use based upon the methodology used to access objects within the present architecture.

In addition to direct ODBC access, the database 152 may also be accessed through the MAPS™ Result Data System. The Result Data System is a collection of SQL tables, C++APIs, and OLE interfaces used to manage the persistent storage and retrieval of measurement data. The Result Data System provides access to the database through three layers—namely, ODBC/SQL, C++API, and OLE. The access method of choice is application-dependent. As illustrated in FIG. 4, the Result Data System provides a layered approach which has various tradeoffs (ease of use/ accessibility), which are illustrated in FIG. 4.

The network API 116 supports the development of communications modules 144, 146, 148, 150 to enable the MAPS™ system to connect and manage the various Wide Area Network (WAN) and Local Area Network (LAN) options. Such options include, but are not limited to, radio, telephone inbound and outbound, power line carrier, handheld terminals, and hybrid systems. The network API 116 passes the data from the remotely connected devices in a standard way, regardless of the communication methods employed. For example, the data passing through the network API 116 from a given electricity meter, such as the SQ400 meter, manufactured by Schlumberger Industries, Inc., of West Union, South Carolina, would be the same, notwithstanding the means by which the meter was connected to the system, i.e., it is independent of whether the meter is connected by telephone connection, RF connection, or direct serial connection. In the device API, the same SQ400 device module would handle any of the above cases.

Separating the device support from the network support is a powerful attribute of the architecture of the present invention, in that the total number of modules required for any network topology is now the sum of the network options and device options, and an increase in these options results in a linear increase in development time. In contrast, if the network and device support were contained in the same modules, as in the prior art, the total number of modules required would be the product of the network options and the device options. This would exponentially increase the time required to build the system as the number of network and device options increase.

The use of the device API 114 in the present invention permits the development of modules to support various end devices and device protocols. As explained above, the supported devices could be any variety of data acquisition devices, including (but not limited to) electricity meters, water meters, gas meters, data concentrators of various types, or even devices of an entirely different nature, i.e., pressure or temperature sensors. Also, as explained above, the data received by these modules is network independent. Thus, the measurements produced by these modules is device independent, allowing application modules to process data from different devices uniformly, as long as the same measurements are supported. For example, an electricity billing application module could read kilowatt-hour consumption data produced by a wide variety of different electricity device modules in a uniform manner, without having to have specialized code in the application module for each kind of metering device.

Separating the device support from the application support thus allows us to avoid the problem of having application modules tailored to each device module supported, which would make the system exponentially more complex as the number of devices and applications increased. Instead, the system complexity increases only linearly with the number of applications and devices, just as with network support, so the total number of modules required for the system is only the sum of applications, devices, and networks (instead of the product of the three). Furthermore, if a customization is required in a device module, only one module is changed in this architecture; with a tightly coupled architecture, a device change could potentially affect dozens of applications and network modules. Again, this decoupling of the three APIs is perhaps the most powerful attribute of this architecture. A further advantage of the preferred embodiment is that the device manufacturer, i.e., Schlumberger Industries, Inc., is able, through the use of the present invention, to develop both the device and is the module needed to communicate with the device API 114, without the need to look to third parties for such support. Similarly, as set forth below, there is no need for a utility to have to develop support for a manufacturer's device simply to be able to develop an application which uses a particular device, as the utility's application need only deal with the Application API 112. If the utility's application makes use of a standard, OLE compliant commercial product, the utility need not concern itself with any of the details of how the application communicates with the devices.

As stated, the application API 112 permits the development of modules to perform various applications such as billing, load survey, tamper detection, and data import/ export, to name just a few. Such applications are generally independent of the devices which provide the raw data, and of the network, although some applications designed specifically for configuration of certain classes of devices or networks are required. Measurement data viewed from the application API 112 is device independent, which makes application development significantly easier, and means that applications, once developed, can take advantage of newly developed devices which provide appropriate inputs to the specific application.

The application API 112 also permits commercial applications to be easily linked to the system. This allows certain software developments to be left strictly to commercial packages, which are generally superior in their respective areas of application. For example, no spreadsheet, charting, or graphing applications are included with the MAPS™ software of the present invention. Instead, system data can be accessed with the Microsoft Excel application with corresponding documents to perform the desired spreadsheet, charting, or graphing operations. In fact, such commercial applications can access the device API 114 and the network API 116 through OLE. This can be demonstrated by a simple Excel "document" that performs a series of demand readings of various meters by communicating directly with the device modules, and then plots the results.

The architecture of the present invention facilitates development by third parties who can develop applications independently. They are now able to produce application, device, or network modules that can simply be plugged into the system. This can be done without any access to MAPS™ code or dynamic linking libraries ("DLL"s). All that they need is the documentation for the three APIs 112, 114, 116. This documentation may be provided in the form of a developer's kit.

As described above, the use of the WIN32 API in the present inventive system means that it may be deployed on platforms running Windows NT, Windows 95, or UNIX® operating systems. Windows 95 runs on Intel architecture PC hardware only. Windows NT and UNIX® can also run on this hardware, but their use permits significantly broader hardware choices. Windows NT is currently deployed on many RISC processors including RS6000, MIPS, PowerPC, and Alpha. UNIX® hardware choices are limited only by the retargeting tools, which currently support SUN, HP, and IBM platforms. The database is not limited to the platforms listed above, but can be run in a client/server fashion on any platform that provides the proper network connectivity and ODBC drivers. This permits database servers to be used on other operating systems such as VM or VMS, as well as the operating systems supported by MAPS™.

The system of the present invention provides a fully distributed architecture that can be implemented on a single platform, or modules can be spread out among a number of platforms connected via any standard network protocol, such as TCP/IP, which is described by Comer, Douglas E.; in *Interworking with TCP/IP*; Prentice-Hall (1991), which is incorporated herein by reference, and as illustrated in FIG. 5.

Figure 5:
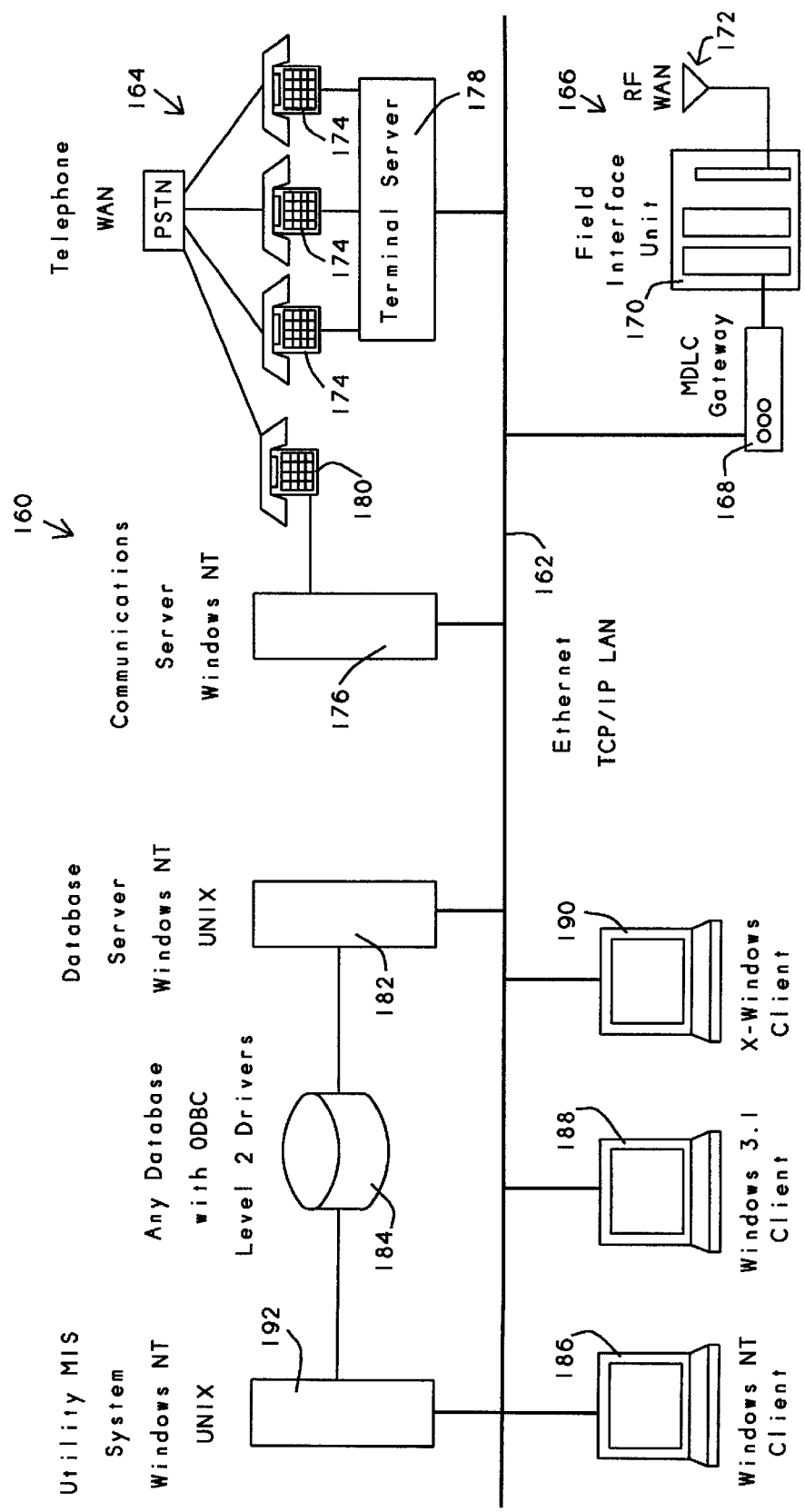
FIG. 5 illustrates a typical system using the present invention.

With reference to FIG. 5, an embodiment of the present invention 160, is shown. In the system 160, an Ethernet TCP/IP Local Area Network ("LAN") 162 has a number of items connected to it. In particular, the system 160 includes two different Wide Area Network ("WAN") access methods—namely, a telephone WAN 164 and a radio (RF) WAN 166, access are shown. The WANs 164, 166 are both connected via TCP/IP Ethernet, and they are accessible by any of the platforms on the Ethernet 162. The RF network 166 is accessed using a gateway, such as the Motorola MDLC gateway 168, and at least one field interface unit 170, which allows access to end devices through a variety of WAN radio options, shown symbolicly by the antenna 172. The telephone WAN 164 is accessed using telephone modems 174 connected to a Communications Server 176 through a terminal server 178. A direct serial modem connection, as illustrated at 180, can be used instead of the terminal server 178 for small operations. The Communications Server 176 provides access to the end devices through the WAN and runs the network and device modules, writing the resulting data to a Database Server 182. The Database Server 182 is connected to an appropriate database 184, i.e., one which supports ODBC Level 2 drivers, as described above.

Applications are typically run from various client machines 186, 188, 190. The most flexible clients is typically a Windows NT platform 186, which can run any MAPS™ modules. Through the use of approrpriate UNIX® retargeting tools, UNIX® client platforms will have the same flexibility. A Windows 3.1 client platform 188 can be used to run Windows 3.1 commercial applications, and an X-Window client 190 can be used on any available platform to access applications running on any of the Windows NT or UNIX® machines. Communication with the utility's MIS System 192 can be either through the database 184 or through the Ethernet 162, as shown.

Figure 6:
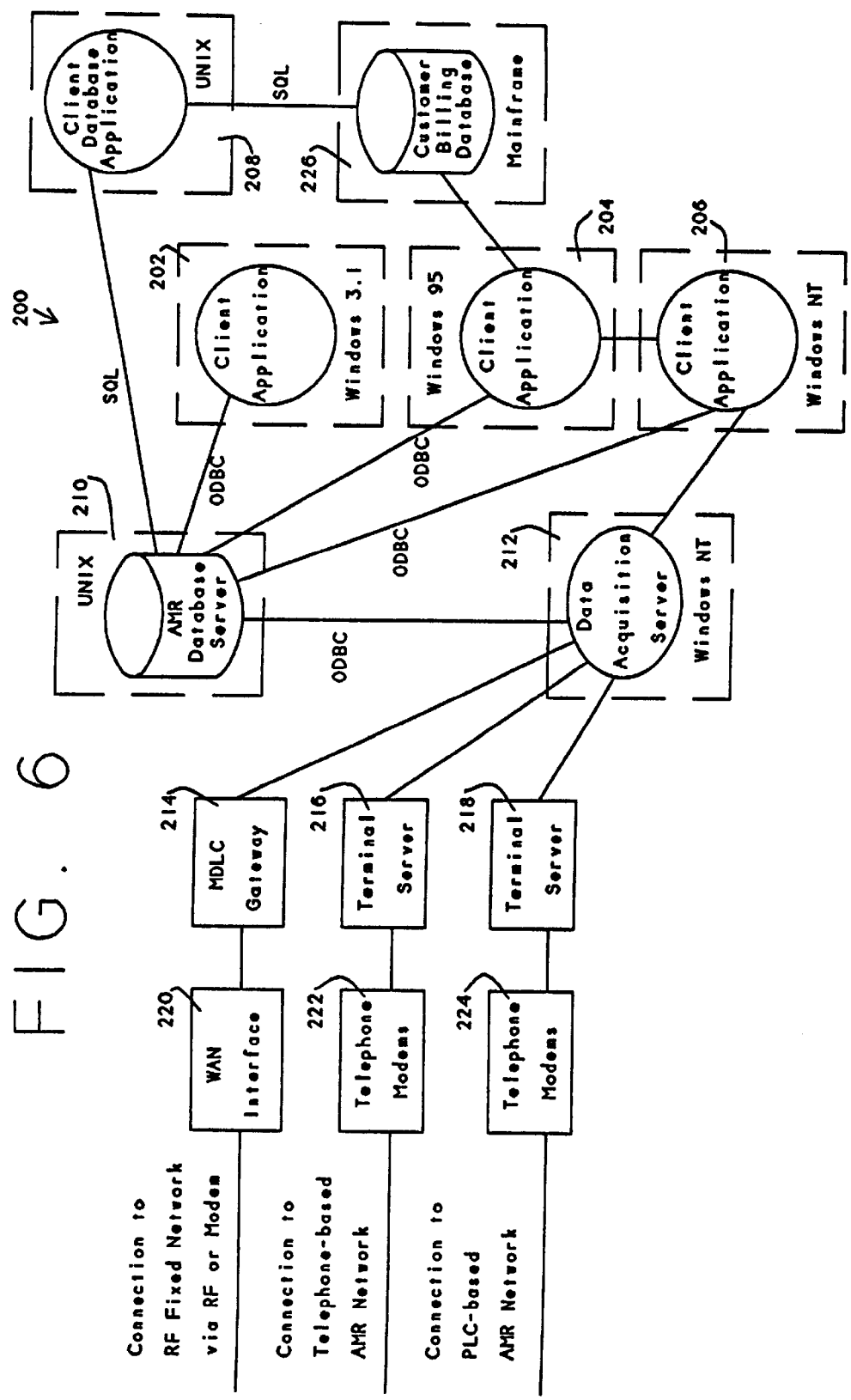
FIG. 6 illustrates a multi-platform system using the present invention for system integration.

FIG. 6 shows a typical organization of MAPS™ modules in a system 200 in which there is a cross-platform hardware deployment. In this system 200, various client applications 202, 204, 206 and a client database application 208 are shown running on four different operating systems—namely, Windows 3.1, Windows 95, Windows NT, and UNIX®, respectively. The client applications 202, 204, 206 are able to communicate with a UNIX®-based AMR database server 210. The database server 210 communicates with a data acquisition server 212, and the data acquisition server 212 communicates with an MDLC Gateway 214, and terminal servers 216, 218. The MDLC Gateway 214 handles connections to an RF Fixed Network through a WAN interface 220. Similarly, the terminal servers 216, 218 handle communications from telephone-based and PLC-based AMR networks through sets of telephone modems 222, 224, respectively. The customer billing database 226, which typically operates on a mainframe, may be connected to the system 200, as shown.

Comunications between the modules uses OLE, ODBC, and SQL, as illustrated, enabling the various client applications 202, 204, 206 to have full access to the available data. For large installations, it is possible to have multiple platforms running data acquisition servers, rather than having a single data acquisition server 212. Also, it is possible to use a distributed database running on multiple platforms, and to have as many client workstations as desired. In addition, several terminal servers and MDLC gateways can be attached to the Ethernet, in a manner similar to that illustrated in FIG. 5. Consequently, the architecture of the present invention can be scaled upwards to handle extremely large and complex data acquisition requirements without departing from the inventive concept.

Figure 7:
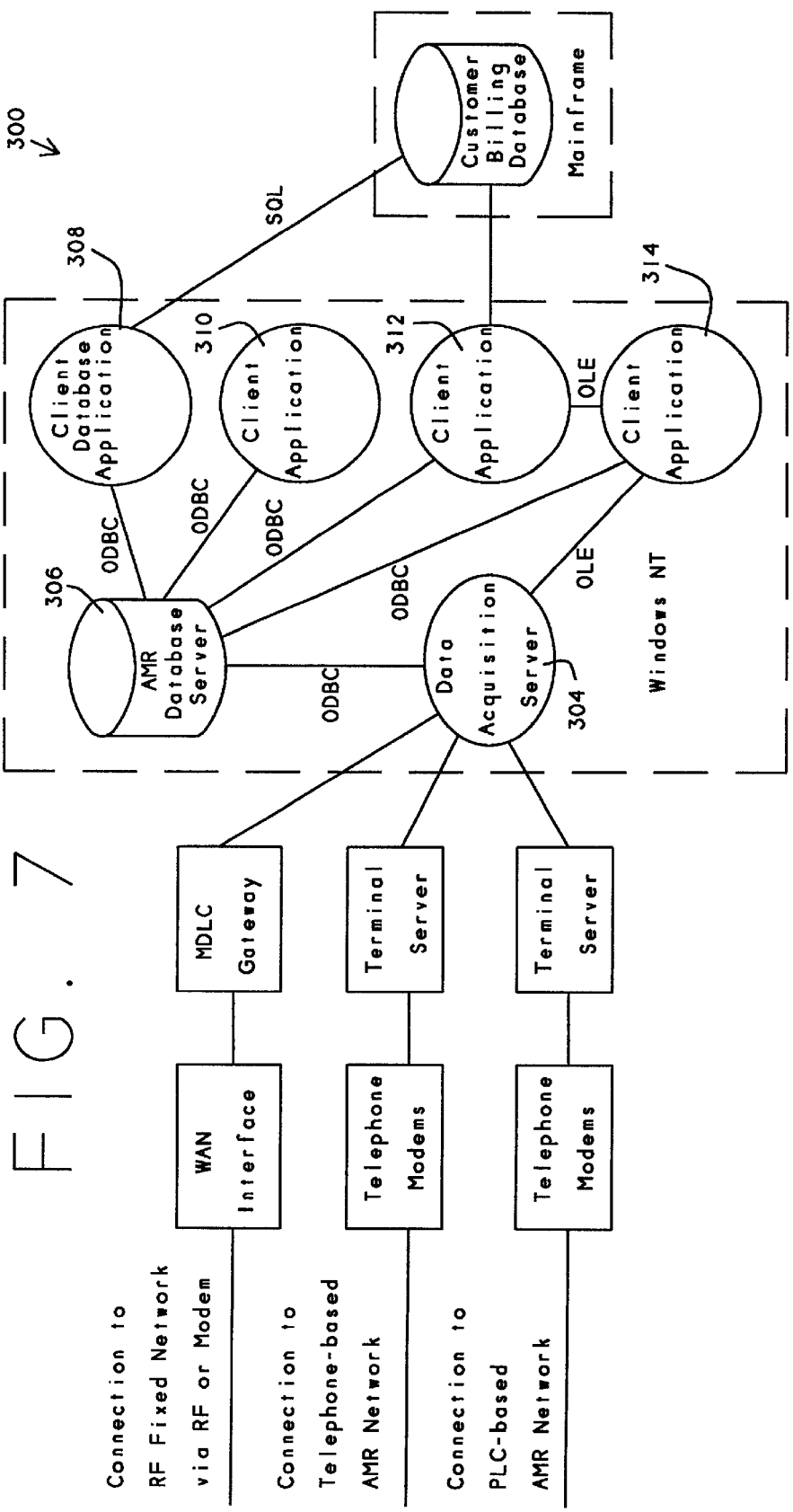
FIG. 7 illustrates a single platform system using the present invention for system integration.

Similarly, the invention can be scaled down to operate on a single platform, i.e., a Windows NT platform, for lower end applications. With reference to FIG. 7, the inventive architecture is shown in a system 300 deployed using a single Windows NT platform 302. An acquisition server 304 (with all of the network and device modules), a database server 306, and all of the client applications 308, 310, 312, 314 share the resources of the single machine running Windows NT. When deployed on a high-end Pentium workstation, even this configuration can handle monthly billing for over 100,000 AMR points.

As will be recognized by those skilled in the art, intermediate configurations can also be deployed using 2 or 3 workstations. If the workstations are all Windows NT platforms, then the MAPS™ modules can be freely distributed between the workstations to obtain the best performance for each particular situation. For example, if heavy application work is needed, then one platform could perform data acquisition and database operations, and another platform could run the client applications. Alternatively, for heavy database needs, the database could be on a separate platform.

Figure 8:
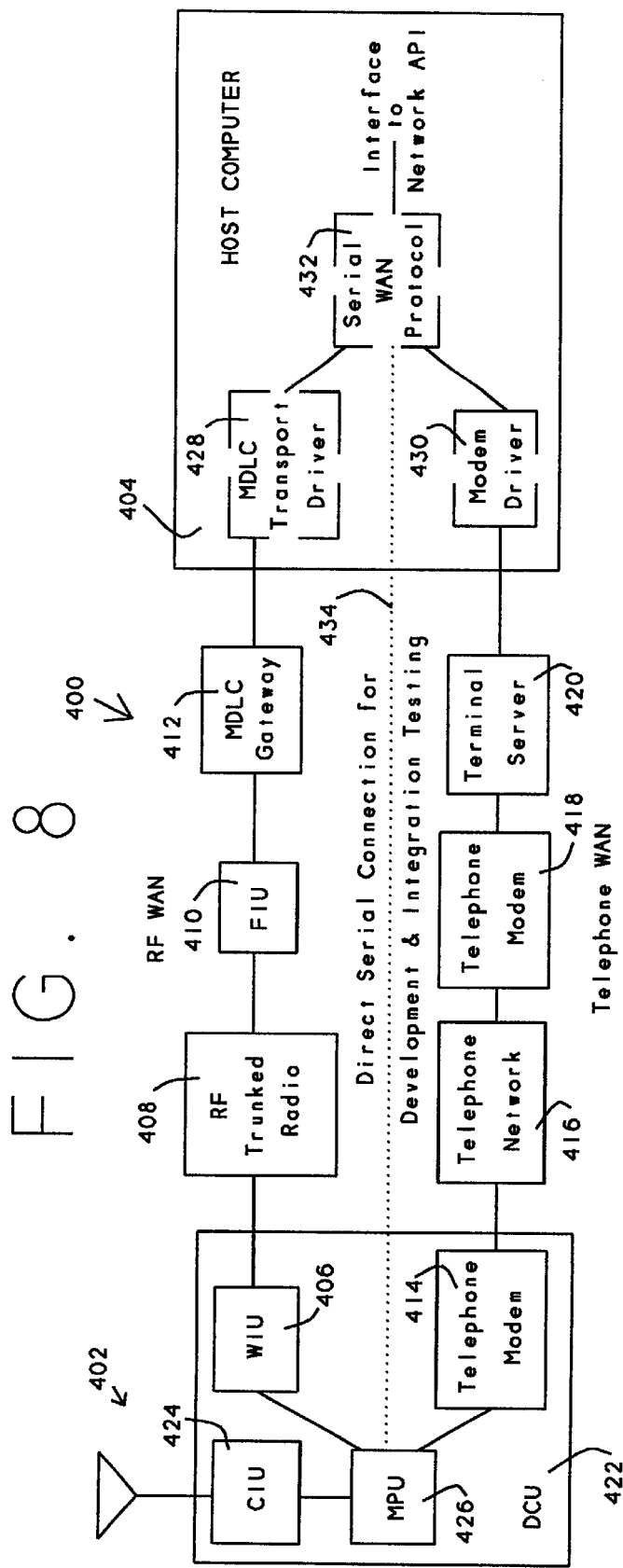
FIG. 8 illustrates a system using the present invention to provide hybrid communications deployment.

Finally, with reference to FIG. 8, a hybrid approach for communications deployment is shown in the system 400, illustrated therein. An RF LAN 402 is shown to be connected to a host workstation 404 using either an RF WAN comprising a WAN Interface Unit ("WIU") 406, RF trunked radio 408, a Field Interface Unit ("FIU") 410, and an MDLC Gateway 412. Alternatively, the RF LAN 402 may be connected to the host 404 by means of a telephone WAN, comprising telephone modems 414, 418, a telephone network 416, and, optionally, a terminal server 420.

A Data Concentrator Unit ("DCU") 422 which communicates with the RF LAN 402, includes a Communications interface Unit ("CIU") 424 which communicates (using a serial LAN protocol) with a Main Processing Unit ("MPU") 426. Similarly, the MPU 426 uses a serial LAN protocol to communicate with the WIU 406 and the telephone modem 414, which are part of the DCU 422.

A serial WAN protocol was devised to facilitate communications independently of the WAN transport method. An appropriate network module in the Host Computer first handles the WAN transport with either an MDLC protocol module 428 or a modem protocol module 430. The resulting data is passed to a serial WAN protocol module 432, which handles this protocol and provides an interface to the Network API. Thus, the data passed through the Network API is independent of the WAN communications method used. As illustrated in FIG. 8 a direct serial connection 434 may be provided between the serial WAN protocol module 432 and the MPU 426 in order to facilitate development and integration testing. As the direct serial connection 434 is not necessary to the operation of the system 400, it is shown using a dashed line.

Similarly, the MDLC protocol could be run over the Telephone WAN and interfaced to the system using the MDLC gateway, or a PLC LAN could be used instead of an RF LAN. Because of the modular network approach provided by the present invention, any kind of hybrid communication deployment could potentially be accommodated by cascading network modules.

As described herein, the architecture of the present invention allows for a wide range of deployment options ranging from very low end single platform systems to very high end distributed heterogeneous systems. Flexible options for the database allows existing customer databases to be used in many cases. Flexible network support allows hybrid networks that are tailored to precise customer requirements. The system scales smoothly to provide an excellent evolutionary path for gradually growing from a small system to full deployment.

As will be recognized by those skilled in the art, the modular software architecture for an AMR system, described herein, provides an architecture in which new applications, new types of communications, new types of devices, and a variety of databases can be easily developed and added. Thus, the invention provides unparalleled flexibility for utility customers to extend the system in ways that would be unimaginable for conventional AMR systems. As the requirements of utility customers are becoming extremely sophisticated, it has become increasingly difficult for any single company to satisfy the growing customer needs and requirements. The ability of the MAPS™ of the present invention to easily integrate solutions from a variety of vendors provides huge benefits over the prior art in addressing these complex system needs.

We claim:

1. A modular object-based architecture for master station software for use in the utility industry comprising:
   (a) an applications interface for communicating with user defined computer applications, said applications interface using an object-oriented interface to communicate with such user defined computer applications;
   (b) a device interface for communicating with hardware devices used in the utility industry selected from the group consisting of data acquisition devices being adapted to acquire utility related data, electricity meters, water meters, and gas meters, said device interface using said object-oriented interface to communicate with said hardware devices;
   (c) a network interface for communicating with network modules used in the utility industry selected from the group consisting of meter interface units, handheld meter reading and programming terminals, power line communications devices, telephone inbound devices of the type used to receive calls from a utility's central computer at a customer's location to report utility meter data to the utility's central computer, radio frequency devices, and concentrator devices to provide access to data which has been collected by said network modules, said network interface using said object-oriented interface to communicate with said network modules;
   (d) means for accessing, through said network interface, a database which is able to store and retain data; and
   (e) interface means for providing communications between said applications interface, said device interface, and said network interface, said interface means using said object-oriented interface to provide such communications.

2. The modular object-based architecture for master station software of claim 1 in which said user defined computer applications are selected from the group of utility related applications consisting of AMR applications, billing applications, communications applications, electric utility applications, water utility applications, gas utility applications, database applications, distribution automation applications, demand side management applications, and device management applications.

3. The modular object-based architecture for master station software of claim 1 in which said hardware devices are comprised of data acquisition devices, said data acquisition devices being adapted to acquire utility related data.

4. The modular object-based architecture for master station software of claim 1 in which said network modules are selected from the group consisting of meter interface units, handheld meter reading and programming terminals, power line communications devices, telephone inbound devices of the type used to call a utility's central computer from a customer's location to report utility meter data, telephone outbound devices of the type used to receive calls from a utility's central computer at a customer's location to report utility meter data to the utility's central computer, radio frequency devices, and concentrator devices.

5. The modular object-based architecture for master station software of claim 1 in which said user object-oriented interface provides for object linking and embedding.

6. The modular object-based architecture for master station software of claim 5 in which said user object-oriented interface is compliant with the OLE standard.

7. The modular object-based architecture for master station software of claim 6 further comprising the addition of DCE/RPC support.

8. The modular object-based architecture for master station software of claim 1 further comprising a database which is accessible by said means for accessing a database, said database being able to communicate with said applications interface and said network interface by means of a standard data access means.

9. The modular object-based architecture for master station software of claim 8 in which said standard data access means provides connectivity between data in a database and an external piece of software seeking to access such data.

10. The modular object-based architecture for master station software of claim 9 in which said standard data access means is compliant with the ODBC standard.

11. A method for providing object-based access within master station software for use in the utility industry comprising:

(a) providing an applications interface for communicating with user defined computer applications, said applications interface using an object-oriented interface to communicate with such user defined computer applications;

(b) providing a device interface for communicating with hardware devices used in the utility industry selected from the group consisting of data acquisition devices being adapted to acquire utility related data, electricity meters, water meters, and gas meters, said device interface using said object-oriented interface to communicate with said hardware devices;

(c) providing a network interface for communicating with network modules used in the utility industry selected from the group consisting of meter interface units, handheld meter reading and programming terminals, power line communications devices, telephone inbound devices of the type used to receive calls from a utility's central computer at a customer's location to report utility meter data to the utility's central computer, radio frequency devices, and concentrator devices to provide access to data which has been collected by said network modules, said network interface using said object-oriented interface to communicate with said network modules;

(d) providing means for accessing, through said network interface, a database which is able to store and retain data; and (e) providing interface means for communicating between said applications interface, said device interface, and said network interface, said interface means using said object-oriented interface to provide such communications.

12. The method of claim 11 in which said step of providing an applications interface is comprised of providing an interface with computer applications selected from the group of utility related applications consisting of billing applications, communications applications, electric utility applications, water utility applications, gas utility applications, database applications, distribution automation applications, demand side management applications, and device management applications.

13. The method of claim 12 in which said step of providing a hardware interface comprises providing a software interface to data acquisition devices, said data acquisition devices being adapted to acquire utility related data.

14. The method of claim 11 in which said step of providing a network interface comprises providing software which can communicate with modules selected from the group consisting of meter interface units, handheld meter reading and programming terminals, power line communications devices, telephone inbound devices of the type used to call a utility's central computer from a customer's location to report utility meter data, telephone outbound devices of the type used to receive calls from a utility's central computer at a customer's location to report utility meter data to the utility's central computer, radio frequency devices, and concentrator devices.

15. The method of claim 11 in which said user object-oriented interface uses for object linking and embedding.

16. The method of claim 15 in which said user object-oriented interface is compliant with the OLE standard.

17. The method of claim 16 further comprising the step of providing support for DCE/RPC.

18. The method of claim 11 further comprising the step of providing a database which is accessible by said means for accessing a database, said database being able to communicate with said applications interface and said network interface by means of a standard data access means.

19. The method of claim 18 in which said standard data access means is selected to provide connectivity between data in a database and an external piece of software seeking to access such data.

20. The method of claim 19 in which said standard data access means is selected to be compliant with the ODBC standard.

* * * * *